March 3, 1959  C. R. STONE ET AL  2,875,977
DIAPHRAGM BALLCOCK
Filed Aug. 19, 1953  2 Sheets-Sheet 1

Inventors.
Carl R. Stone, &
Edward G. Schmidt.
By Joseph O. Lange
Atty.

United States Patent Office 2,875,977
Patented Mar. 3, 1959

2,875,977

DIAPHRAGM BALLCOCK

Carl R. Stone, Lombard, and Edward G. Schmidt, La Grange, Ill., assignors to Crane Co., Chicago, Ill., a corporation of Illinois Application August 19, 1953, Serial No. 375,179

8 Claims. (Cl. 251—331)

This invention relates generally to valves, and more particularly it is concerned with the type termed either ballcocks or float type supply valves for closet tanks.

The primary object of this invention is to provide a valve of the above type which is unusually quiet in operation.

A further object is to provide such quietly operating valve of relatively simplified construction.

Other objects and advantages will become more readily apparent upon proceeding with the description read in light of the accompanying drawings, in which Fig. 1 is a sectional assembly view of a ballcock incorporating our new design.

Similar reference numerals refer to similar parts throughout the several views.

Figures 1, 2:
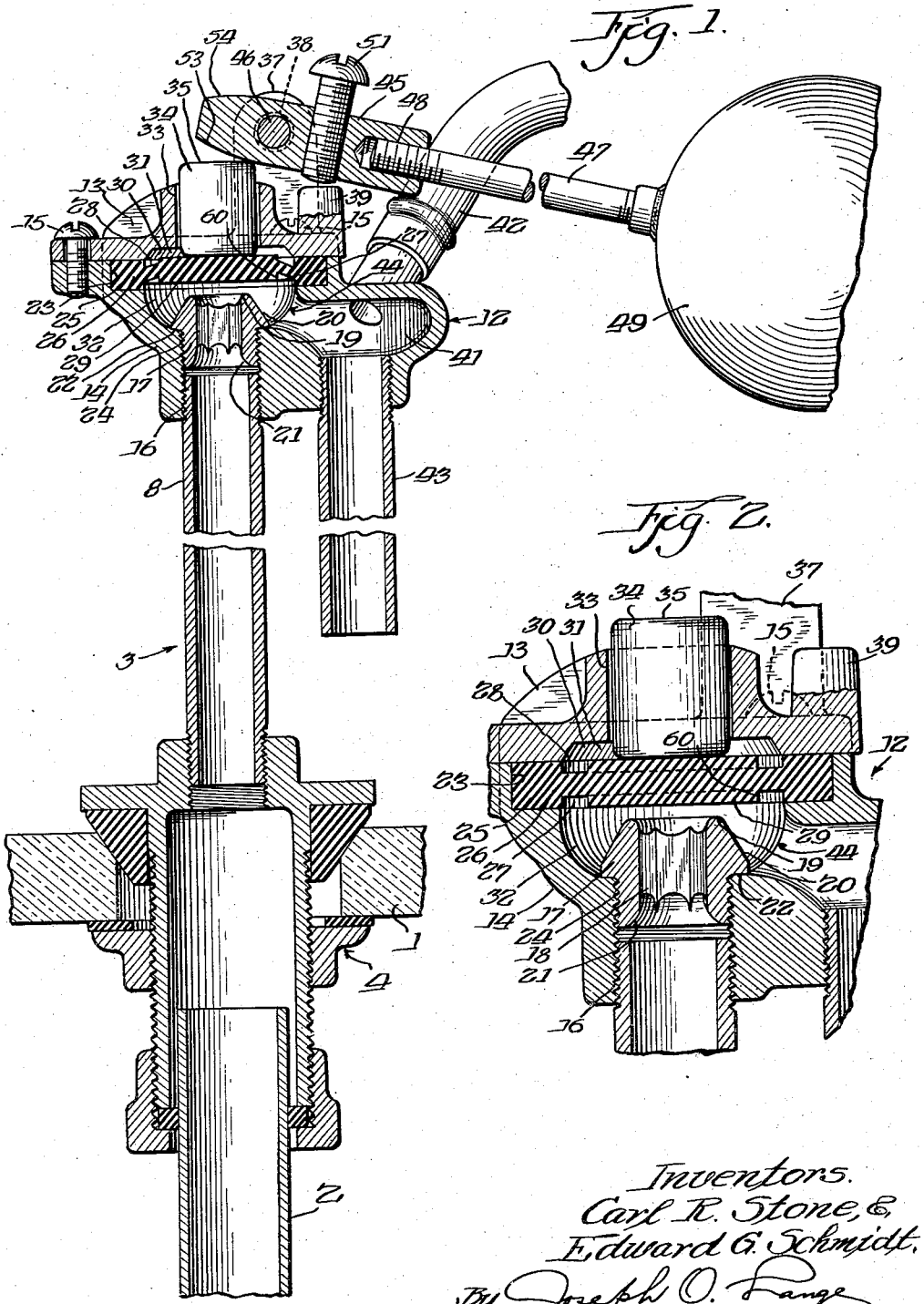
Fig. 2 is an enlarged fragmentary portion of the valve showing in particular the novel seat member and stepped diaphragm, the latter being in an unstressed condition.

Referring in detail to the drawing particularly to Figs. 1 and 2 thereof, 1 is a fragmentary portion of a flush tank through which a ballcock or float supply valve generally designated 3 and constructed according to this invention is mounted by means of the usual fluid tight connection generally at 4, the water supply line 2 extending into this connection at the bottom thereof. Rising from this connection is a standpipe 8 on the upper end of which is mounted as by threading at 16 the body or casing of the ballcock generally designated 12.

The body 12 is preferably separable and is made up of an upper and lower portion 13 and 14, respectively, connected together as by means of screws 15. The body has a hollow interior or chamber 30 which is divided into an upper and lower chamber 31 and 32, respectively, by a flexible diaphragm 25 which extends across the same as shown. Below the diaphragm is a seat member 17 having a port 18 for the passage of inlet fluid within the chamber 32.

The upper portion 13 of the body is bored or recessed at 33 for reception of the cylindrical plunger 34 which extends into the upper chamber 31 of the body engaging the top of the diaphragm for movement of the same into fluid sealed contact with the seat member 17 for closure of the valve. The upper portion of the body is also provided with a pair of spaced ears or projections 37 (only one being shown) coaxially apertured at 38 for pivotal support of the pin 46 of the float rod arm 45. This pin is preferably integral with or connected to the rod arm so as to rotate therewith and extend through the ears 37 for firmer support and adding to greater lateral stability of the rod arm.

The float rod arm 45 is provided with a float rod 47 threadedly received therewithin at 48, at the outer end of which is the usual float or ball 49. Extending through the rod arm which is polygonal and preferably square or rectangular in cross section is a screw 51 for adjustably limiting the downward movement of the said arm and the structure attached thereto by contact with the stop 39 of the upper portion 13 of the body when the tank 1 is emptied during the flushing operation. Since the float rod arm 45 engages the top of the plunger 34 and the upward movement of the latter and of the diaphragm therebelow under the action of the inlet pressure for valve opening is likewise limited, rotation of the screw 51 will adjust the rate of flow through the valve for the desired time of tank filling.

The front end of the float rod arm is rounded at 53 and the upper surface or top 35 of the plunger is flat and normal to the axis thereof to provide for a moving or shifting contact between the two. This results in a change of leverage and consequently the force applied to the plunger and diaphragm as the float assembly rotates. This benefit is particularly of importance during the tank refilling and valve closing operation to prevent chatter or the setting up of a condition of unbalance attendant with severe vibration and noise during the final phase of valve closure. This subject matter is especially treated in co-pending application Serial No. 373,736, filed August 12, 1953, now Patent No. 2,745,428. The shifting engagement between the float rod arm 45 and plunger 34 and its elimination of the bothersome and destructive action in a new and more practical and effective way forms the subject matter of that application to which attention is directed for a more complete explanation of the structure and operation of the valve. Briefly, however, the lower surface 53 of the rod arm is so shaped that in cooperation with the flat top 35 of the plunger the force exerted on the latter as the float rises decreases to the extent necessary to only slightly exceed the total force of the inlet fluid on the underside of the diaphragm, particularly just prior to contact of the diaphragm with the seat when the total force on the underside of the diaphragm falls off rapidly, to prevent overshooting or slamming shut of the closure member and subsequent rebounding and reopening because of the inherent resiliency and the action of the inlet pressure within the port 18, both of which move the closure member beyond the point of balance in the opposite direction, attempted restoration of which is by way of the float member acting through the leverage. This actually drives the closure onto the seat even more forcefully than before, to repeat the cycle with increasing intensity thus initiating a condition of harmonic unbalance and vibration leading to injury and destruction of the valve and disturbing noises. Besides reducing the tendency of the closure member to overshoot or slam into the seat in the first instance by the decreased leverage as the contact between the rod arm and plunger moves from the inner edge of the latter to approximately the center thereof, any rebounding or subsequent reopening of the closure member is immediately countered by increased leverage as the float assembly rotates in the opposite direction, the greater the rebound or opening movement the greater the increase in leverage to resist the same. The movement in this direction is quickly absorbed or brought to a halt and the closure member is returned to the seat contacting portion, the cycle repeating if there is any further rebounding or slight opening until the movement is dissipated and the closure member is firmly seated which usually takes place in one or two oscillations. Thus, a positive and automatic dampening action is also provided.

For reversal of parts, the upper surface of the float rod arm may likewise be curved at 54, the surface being a duplicate of 53 and for the same purpose upon reversal or alternate mounting.

The lower part 14 of the valve body is provided with a cavity 41 in communication with the chamber 32 for discharge of the inlet fluid therefrom through the refill tube 42 and hush tube 43 in accordance with ordinary flush tank supply valve operation.

Turning now to a consideration of the diaphragm and seat member 25 and 17, respectively, with which this application is particularly concerned and their effect on the reduction or elimination of the water sound during fluid discharge therebetween, the lower body portion 14 is annularly recessed or counterbored at 23 for reception of the diaphragm 25 which is substantially flat or disc-like and preferably constructed of rubber or similar material. This member is of a thickness particularly at the outer or peripheral portion 26 thereof which is slightly greater than the depth of the counterbore 23 so that the same can be squeezed or compressed slightly between the upper and lower body portions 13 and 14 as they are secured in mounted relation by means of the screws 15 to prevent leakage through this connection. Thus, the diaphragm serves as a gasket or seal besides its other functions. In this connection, it should be noted that there is metal to metal contact between the portions of the body outwardly of the diaphragm so that the latter is compressed or squeezed only to the extent necessary to form a proper seal between these portions and no more, thereby preventing excessive flow or other injury to the diaphragm objectionably affecting its operation.

It is well known that most ball cocks or float supply valves are noisy as a result of water flow therethrough, sometimes of a very noticeable and annoying nature as the closure member is moving towards the seat. In the present valve, it has been found that the provision of an annular groove or recess 27 in the lower surface of the flexible diaphragm outwardly of the center seat contacting portion 29 and exposed to the fluid in the chamber 32 has a marked effect on the performance of the valve from the standpoint of noise reduction and quietness of operation. The reason for this is not definitely known or at best is conjectural, but the effect on the reduction of noise has been definitely ascertained as shown by the graphs marked Figs. 3 and 4.

Figure 3:
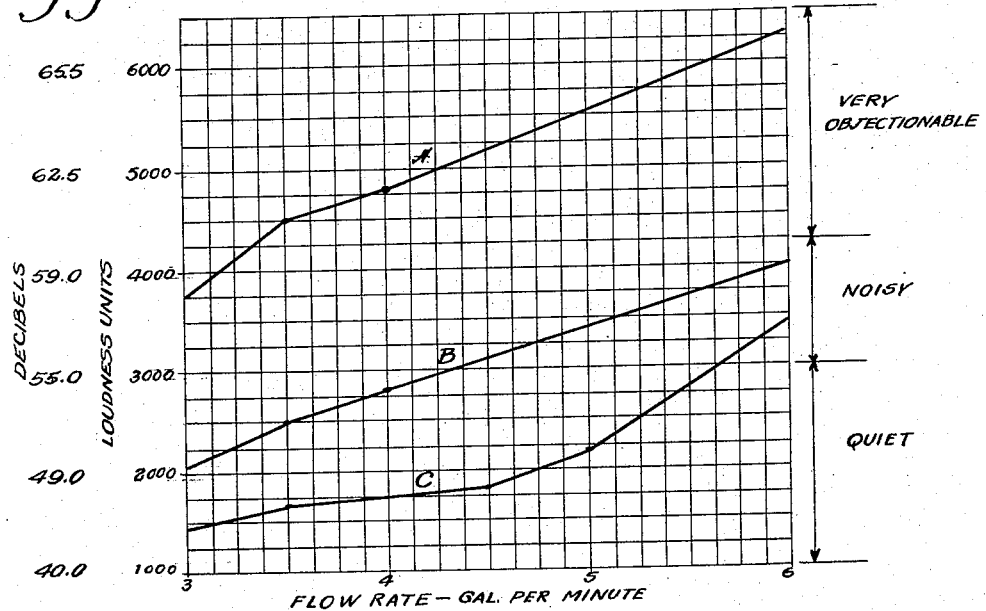
Fig. 3 is a graph showing a noise level test at one pressure range of operation.

Referring in detail to the graph of Fig. 3, noise level performance curves are therein shown for various valves, linear Loudness Units being plotted against flow rate in gallons per minute as shown, for a 40-pound per square inch inlet or supply pressure. Curve A shows the noise level for a valve provided with a plain flat unstepped or unrecessed diaphragm of substantially uniform thickness similar to some of those found in the prior art. This valve definitely lies within the noisy or objectionable range throughout the various flow rates and is undesirable. Curve B on the other hand shows the very same valve except for the employment of the stepped or annularly recessed diaphragm shown in Figs. 1 and 2 and previously described. It is obvious that this seemingly slight change has resulted in a valve which is approximately twice as quiet as that of curve A throughout its entire flow variation and falls within the "quiet" range for the ordinary flow rates of between three and four gallons per minute which requires from about one minute and fifteen seconds to one minute, respectively for tank filling after the flushing operation. Curve C concerns the seat member and will be discussed subsequently. It should be mentioned, however, that the values of curves A and B are not provided with the seat member shown in the drawing and identified by numeral 17, but rather with a more conventional type which does not give as good performance, as will be seen.

Figure 4:
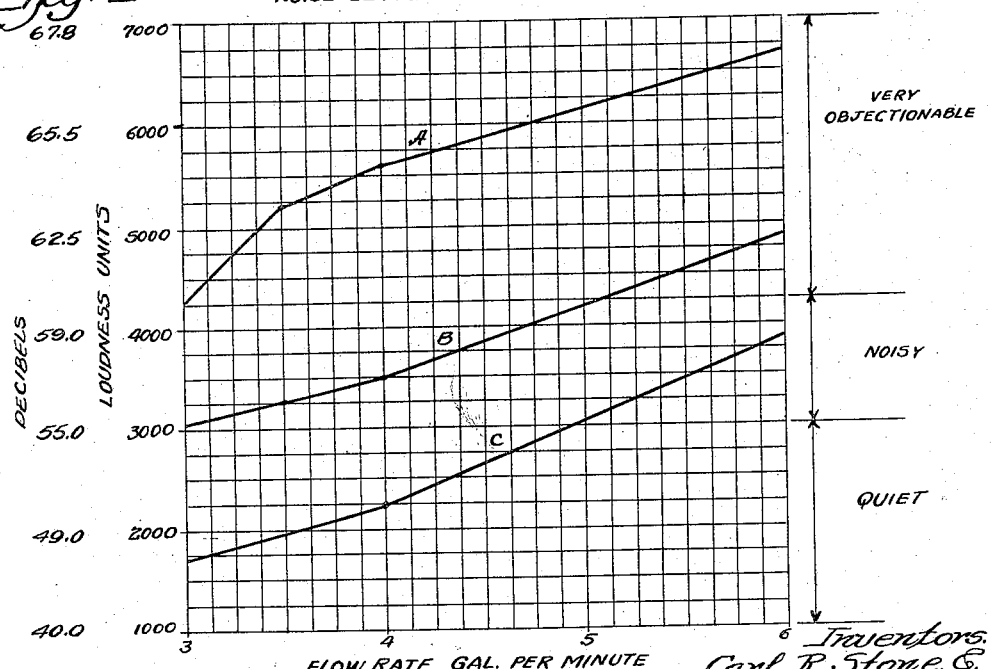
Fig. 4 is a graph similar to that of Fig. 3, but for a different pressure range of operation.

Referring now to the graph of Fig. 4, curves A and B are therein shown representing the same valves as the equivalent curves of Fig. 3 and plotted in the same way, except that an inlet or supply pressure of eighty pounds per square inch has been used to represent the higher range of pressures often encountered. Curve A representing the plain unstepped diaphragm has moved up to an excessively noisy position, particularly for any flow rate over three gallons per minute. Curve B has also moved up, but is still considerably below the other even under the forty pound pressure of Fig. 3. Moreover, the curve is flatter and the noise increases at a much slower rate in the normally satisfactory flow range of from three to four gallons per minute previously noted. The level of noise for this flow range is at the top of the quiet zone and still is not objectionable even under the higher pressure.

It is thus further apparent that a remarkable improvement in quietness of operation has resulted from the use of the present diaphragm over the plain variety, which improvement is unexpected and which converts an otherwise noisy valve into one of generally desirable performance.

It should also be mentioned that a greater flexibility of the diaphragm 25 in its seating and opening movement is derived from the annular relief therearound, said relief being duplicated in the upper surface at 28 to further this flexibility and for reversibility of the diaphragm.

Although the diaphragm as illustrated and described has been provided with an annular groove or recess 27 in the lower surface thereof, the actual use of such a groove or recess is not necessarily essential to the desired silencing effect. For instance, the same effect would be produced and quieting action procurable by making the diaphragm of a thickened or raised central portion presently identified by numeral 29 for contact with the valve seat and a reduced portion outwardly thereof which is partly exposed to the fluid within the valve and which extends between the upper and lower body portions similarly to the present arrangement except for the elimination of the thickened portion outwardly of the present groove 27. What appears essential, however, is that there is a stepped or two level lower surface with an intermediate or transitional surface 60 of cylindrical form for entrapment of the fluid from the ported seat 17.

Moving now to a description of the seat member, it has been found that equally surprising results in the direction of valve quietness have flowed from what appears to be rather slight or unimpressive changes therein in the direction of mere streamlining. For instance, the mouth or inlet end of the seat member 17 has been rounded at 21. Also, the top of the member is rounded or curved at 19 forming the seat surface for engagement by the diaphragm in the closed position. The latter curve, however, comprises a crown or upper extremity of constant radius, that is, one of single radius and fixed center in longitudinal section, as can best be seen in Fig. 2, which ordinarily is undesirable in valves like this because of the production of cavitation and turbulence, the rate of divergence of the surface being too great for the flow to adhere thereto. It has been necessary in the past to resort to various practices to overcome this tendency and to produce a smooth flow through the chamber 32 and into the cavity 41 such as to provide a substantially flat top which is only slightly divergent or outwardly sloping. Also, a top which is similar to the above except that it slopes slightly inwardly towards the port rather than away from it has been tried with success. Apparently, there is some relation between the crown of full curvature and constant radius and the stepped diaphragm or annularly recessed diaphragm 25 which permits employment of the former for still greater improved valve operation. Or what is more likely, there is probably some connection between the entire seat member of the present valve and the stepped diaphragm, including the curved mouth 21 of the said member and the outwardly sloping conical surface 20 which the crown top merges into.

The rounded entranceway 21 in combination with the crown formation 19 above referred to and the conical surface 20 outwardly of the latter seem to produce a smoother flow into and out of said seat member which is characterized by holding or adhering to the surfaces of the same throughout the course of movement therealong to prevent cavitation and turbulence and to provide for more efficient fluid transmission. Also, the straight portion of the passageway 18 is rather short which may contribute to the unitary flow effect of the seat member.

Elimination of the curved mouth 21, for instance, and the use of even a beveled entranceway does not at all give the results the former does. So there is more involved than a mere funneling action. A full curvature is necessary at the mouth as well as at the exit end to produce the unity of flow through and around the member and adherence to the walls and surfaces thereof for full smooth flow through the same.

Referring again to the charts of Figs. 3 and 4, curve C of each of these charts shows the performance of a valve equipped with both the stepped diaphragm 25 and seat member 17 presently shown plotted in the same manner as for curves A and B for supply pressures of 40 and 80 p. s. i. for the two charts respectively. It is evident that further improvement of a marked nature has taken place, and that the valve now falls within the quiet range for substantially the entire flow variation and is particularly quiet through the ordinary flow of from three to four gallons per minute or so for forty pounds of pressure. For high pressure use as illustrated by the eighty pound pressure of the Fig. 4 graph, the valve is well within the quiet zone for the ordinary flow rates and although higher for increased flow, the performance is still satisfactory even though these rates are almost never used. It should be pointed out in connection with the graphs that the approximate values in decibels are also indicated in the margin opposite the even thousandths of Loudness Units, the latter Units being set forth in American Standards Association standard ASA Z24.2 of 1942 and the previous standard.

Although the diaphragm 25 has substantially lowered the noise level of the valve, use of the seat member 17 along with the diaphragm has further decreased the noise and refined the valve to the point of extreme quietness throughout a broad range of pressures and flow rates. The seat member may, of course, be used alone or with a plain diaphragm for instance with some improvement by virtue of the flow characteristics above described, but the best performance from the standpoint of reduced noise is obtained by use of the seat member with the stepped diaphragm, the two cooperating together in some obscure manner to produce the results reflected by the curves or graphs already considered. In this connection, the inside of the valve body is annularly curved at 44 just outwardly of the conical surface 20 of the seat member which appears to have an interrelating function between the seat member and diaphragm by apparently scooping or raising the fluid as it comes off the conical surface in a smooth non-turbulent manner to the outer recessed portion of the diaphragm. The curvature referred to inside the body seems to contribute to better overall performance of the valve. It is believed pertinent to all of the above to mention that regarding supply valves or ballcocks long years of experience on the part of those skilled in the art have shown that the hydraulics and action of these valves is rather unpredictable and that slight changes and even manufacturing variations are often critical or have a significant effect on the effectiveness and operation of the valve, even making the difference between a good commercial valve and one which is unsatisfactory and not favorably accepted by the public.

To complete the description of the seat member 17, the port 18 through the same is preferable of polygonal form in cross section to accommodate a wrench for rotation of the seat member into and out of position during assembly and disassembly thereof within the valve body.

The conical surface 20 terminates in an annular shoulder 22 to limit the downward movement of said member in assembly and to serve as a seal with the inside of the body. It should also be noted in connection with mounting of this member that the same is threaded at 24 for reception within the same threads or extension of the same threads 16 as receive the standpipe 8. This arrangement results in a simpler and more compact valve which is easier and less expensive to make.

It should be evident from the foregoing description that a novel float valve or ballcock has been produced possessing unusual quietness in operation. Although it is preferable to use the diaphragm and seat member of this invention together for combined or interrelated results, it is not desired necessarily to limit the same to such use as some unexplained benefits appear to flow from the use of these members also separately. Further, it is not desired to be limited to the details of the embodiment presently shown and described, but rather to the terms of the appended claims.

We claim:

1. In a ballcock, the combination comprising a hollow member having an inlet and outlet and including a ported seat portion through which the inlet extends, said ported seat portion projecting into the hollow interior of said hollow member, a flexible diaphragm secured across the hollow interior of said hollow member and engageable with said ported seat portion for the closed valve position, said seat portion terminating in a crown of constant radius serving as a seat for engagement of the diaphragm and merging into the exterior surface of the seat portion, said surface increasing in diameter in the direction away from the terminus of the crown in contact with the diaphragm in the closed valve position, said surface of increasing diameter extending substantially to a portion of the inside surface of the hollow member extending from adjacent the surface of increasing diameter in a smooth curve sweeping in the direction of the diaphragm and smoothly joining with the portion of the inside surface of the hollow member adjacent the side of the diaphragm facing the inlet, said diaphragm having a raised surface, on the side of the diaphragm facing the inlet, extending across the center where it overlies the port of the ported seat portion and engages the crown of constant radius of the seat portion in the closed valve position, said diaphragm being annularly relieved, on the side of the diaphragm facing the inlet, relative to the latter raised surface outwardly of the raised surface beyond the crown of constant radius of the seat portion, the outward extent of the annular relief of the diaphragm being at least to said portion of the inside surface of the hollow member adjacent the side of the diaphragm facing the inlet, said raised central surface being substantially flat across its extent in the unflexed condition of the diaphragm, the annular relief of the diaphragm providing an annular substantially flat surface in the unflexed condition of the diphragm which with the substantially flat raised central surface provides a stepped surface of the diaphragm on the side thereof facing the inlet, said annular relief providing a substantially cylindrical surface forming at least that part of the bounding surface of said annular substantially flat surface, adjacent the raised central surface of the diaphragm, farthest from said annular substantially flat surface so as to form a sharp edge with the substantially flat raised central surface of the diaphragm.

2. In a ballcock, the combination comprising a hollow member having an inlet and outlet and including a ported seat portion through which the inlet extends, said ported seat portion projecting into the hollow interior of said hollow member, a flexible diaphragm secured across the hollow interior of said hollow member and engageable with said ported seat portion for the closed valve position, said seat portion terminating in a crown of constant radius serving as a seat for engagement of the diaphragm and merging into the exterior surface of the seat portion, said surface increasing in diameter in the direction away from the terminus of the crown in contact with the diaphragm in the closed valve position, said surface of increasing diameter extending substantially to a portion of the inside surface of the hollow member extending from adjacent the surface of increasing diameter in a smooth curve sweeping in the direction of the diaphragm and smoothly joining with the portion of the inside surface of the hollow member adjacent the side of the diaphragm facing the inlet, said diaphragm having a raised surface, on the side of the diaphragm facing the inlet, extending across the center where it overlies the ported seat portion and engages the crown of constant radius of the seat portion in the closed valve position, said diaphragm being annularly relieved, on the side of the diaphragm facing the inlet, relative to the latter raised surface outwardly of the raised surface beyond the crown of constant radius of the seat portion so as to present an annular relief surface, the outward extent of the annular relief of the diaphragm being at least to said portion of the inside surface of the hollow member adjacent the side of the diaphragm facing the inlet, said annular relief providing a substantially cylindrical surface forming at least that part of the bounding surface of said annular relief surface, adjacent the raised central surface of the diaphragm, farthest from said annular relief surface so as to form a sharp edge with the raised central surface of the diaphragm.

3. In a ballcock, the combination comprising a hollow member having an inlet and outlet and including a ported seat portion through which the inlet extends, said ported seat portion projecting into the hollow interior of said hollow member, a flexible diaphragm secured across the hollow interior of said hollow member and engageable with said ported seat portion for the closed valve position, said seat portion terminating in a crown of constant radius serving as a seat for engagement of the diaphragm and merging into the exterior surface of the seat portion, said surface increasing in diameter in the direction away from the terminus of the crown in contact with the diaphragm in the closed valve position, said surface of increasing diameter extending substantially to a portion of the inside surface of the hollow member extending from adjacent the surface of increasing diameter in a smooth curve sweeping in the direction of the diaphragm and smoothly joining with the portion of the inside surface of the hollow member adjacent the side of the diaphragm facing the inlet, said diaphragm having a central portion for engagement with the crown of constant radius of the seat portion in the closed valve position, the surface of the central portion facing the inlet being smooth and uninterrupted, the surface of the diaphragm facing the inlet being annularly relieved outwardly of the central portion, the outward extent of the annular relief of the diaphragm being at least to said portion of the inside surface of the hollow member adjacent the side of the diaphragm facing the inlet, said annular relief providing at the inner limit thereof a surface substantially cylindrical at least adjacent said surface of the central portion so as to form a sharp annular edge with said latter surface.

4. In a ballcock, the combination comprising a hollow member having an inlet and outlet and including a ported seat portion through which the inlet extends, said ported seat portion projecting into the hollow interior of said hollow member, a flexible diaphragm secured across the hollow interior of said hollow member and engageable with said ported seat portion for the closed valve position, said seat portion terminating in a crown of constant radius serving as a seat for engagement of the diaphragm and merging into the exterior surface of the seat portion, said surface increasing in diameter in the direction away from the terminus of the crown in contact with the diaphragm in the closed valve position, said surface of increasing diameter extending substantially to a portion of the inside surface of the hollow member extending from adjacent the surface of increasing diameter in a smooth curve sweeping in the direction of the diaphragm and smoothly joining with the portion of the inside surface of the hollow member adjacent the side of the diaphragm facing the inlet, said diaphragm having a central portion for engagement with the crown of constant radius of the seat portion in the closed valve position, the surface of the diaphragm facing the inlet being annularly relieved outwardly of the central portion, said annular relief providing at the inner limit thereof a surface substantially cylindrical at least adjacent the inlet facing surface portion of the central portion adjacent the relief so as to form a sharp edge with said latter surface portion.

5. In a ballcock, the combination comprising a hollow two-part body having an inlet and outlet and a ported seat member secured within said inlet and projecting into the hollow interior of the body therefrom, a flexible diaphragm within said body engageable with said seat member for the closed valve position, said diaphragm extending across the interior of the hollow body and being secured between the two parts of the body, said ported seat member having a rounded mouth of smooth curvature leading into the port thereof, the smooth curvature of the mouth extending substantially from the periphery of the inlet, the entrance of the mouth being of substantially the same size as the inlet from which it leads, said seat member terminating in a crown of constant radius at the opposite end of the port serving as a seat surface for engagement of the diaphragm and merging into an outwardly divergent generally conical surface around the exterior of the member within the hollow interior of the body, said outwardly divergent generally conical surface of the seat member extending substantially to the inside surface of the hollow body, the portion of the latter inside surface adjacent the generally conical surface of the seat member extending therefrom in a smooth sweeping curve in the direction of the diaphragm and smoothly joining with the portion of the inside surface of the body adjacent the side of the diaphragm facing the inlet, said diaphragm being thickened across the center where it overlies the port of the seat member and engages the crown of constant radius of the seat member in the closed valve position to provide a raised central surface on the side of the diaphragm facing the inlet, said diaphragm being reduced in thickness relative to the latter thickened portion outwardly thereof beyond the crown of constant radius of the seat member to provide an annularly relieved surface relative to said raised surface on the side of the diaphragm facing the inlet, said latter relieved surface extending at least to said portion of the inside surface of the body adjacent the side of the diaphragm facing the inlet, said raised central surface being substantially flat across its extent in the unflexed condition of the diaphragm, said relieved surface being substantially flat in the unflexed condition of the diaphragm which with the substantially flat raised central surface provides a stepped surface of the diaphragm on the side thereof facing the inlet, the limit of the central raised surface being defined by a circular annular surface extending from the flat relieved surface of the reduced portion to the central raised surface and forming a sharp annular edge at the periphery of the flat surface of the latter thickened portion, said circular annular surface being substantially cylindrical at least adjacent said central raised surface.

6. In a ballcock, the combination comprising a hollow two-part body having an inlet and outlet and a ported seat member secured within said inlet and projecting into the hollow interior of the body therefrom, a flexible diaphragm within said body engageable with said seat member for the closed valve position, said diaphragm extending across the interior of the hollow body and being secured between the two parts of the body, said ported seat member having a rounded mouth of smooth curvature leading into the port thereof, the smooth curvature of the mouth extending substantially from the periphery of the inlet, the entrance of the mouth being of substantially the same size as the inlet from which it leads, said seat member terminating in a crown of constant radius at the opposite end of the port serving as a seat portion for engagement of the diaphragm and merging into an outwardly divergent generally conical surface around the exterior of the member within the hollow interior of the body, said flexible diaphragm comprising a flat disc of substantially uniform thickness when unflexed except for oppositely disposed annular grooves adjacent the peripheral support of the diaphragm within the body and outwardly of the crown of constant radius of the seat member, the outer edges of the grooves being substantially even with the portions of the inside surface of the body extending on each side of the diaphragm, said outwardly divergent generally conical surface of the seat member extending substantially to the inside surface of the hollow body, the portion of the inside surface adjacent the ported seat member extending therefrom in a smooth sweeping curve merging with the portion of the inside surface of the body adjacent the side of the diaphragm facing the inlet, the grooved portion of the diaphragm having a pair of annular substantially flat surfaces in the unflexed condition of the diaphragm forming the back surface of each of the grooves, the portion of the diaphragm towards the center from the grooves being defined at its periphery by a pair of circular annular surfaces extending respectively from each of the flat surfaces of the grooves to the opposite surfaces of said portion of the diaphragm toward the center from the grooves forming a sharp annular edge at each of the peripheries of said opposite surfaces, said circular annular surfaces being substantially cylindrical at least adjacent said opposite surfaces of said portion of the diaphragm towards the center from the grooves.

7. The subject matter of claim 6, said ported seat member being secured within said inlet of the body by means of threading between the said inlet and seat member, the portion of said ported seat member having said outwardly divergent generally conical surface being of greater size than the inlet and overlapping the inside of the body immediately surrounding the portion of the seat member extending within the inlet in substantial fluid sealing abutting engagement therewith, said seat member being drawn into the fluid sealing engagement and being secured therein by means of the threaded engagement between the portion of the seat member within the inlet and the said inlet of the body, said hollow body being separable to permit assembly or removal of both the diaphragm and said seat member.

8. In a ballcock, the combination comprising a hollow two-part body having an inlet and outlet and a ported seat member secured within said inlet and projecting into the hollow interior of the body therefrom, a flexible diaphragm within said body engageable with said seat member for the closed valve position, said diaphragm extending across the interior of the hollow body and being secured between the two parts of the body, said ported seat member having a rounded mouth of smooth curvature leading into the port thereof, the smooth curvature of the mouth extending substantially from the periphery of the inlet, the entrance of the mouth being of substantially the same size as the inlet from which it leads, said seat member terminating in a crown of constant radius at the opposite end of the port serving as a seat surface for engagement of the diaphragm and merging into an outwardly divergent generally conical surface around the exterior of the member within the hollow interior of the body, said flexible diaphragm comprising a flat disc of substantially uniform thickness when unflexed except for oppositely disposed annular grooves adjacent the peripheral support of the diaphragm within the body and outwardly of the crown of constant radius of the seat member, the outer edges of the grooves being substantially even with the portions of the inside surface of the body extending on each side of the diaphragm, said outwardly divergent generally conical surface of the seat member extending substantially to the inside surface of the hollow body, the portion of the inside surface adjacent the ported seat member extending therefrom in a smooth sweeping curve merging with the portion of the inside surface of the body adjacent the side of the diaphragm facing the inlet, the grooves of said diaphragm presenting flat annular surfaces in the unflexed condition of the diaphragm and each groove having inner and outer concentric substantially cylindrical surfaces forming at least the parts of the sides of the grooves farthest from said flat surfaces of the grooves so as to form sharp edges with the opposite faces of the diaphragm.

References Cited in the file of this patent

UNITED STATES PATENTS

| Number | Name | Date |
|---|---|---|
| 779,069 | Burchett | Jan. 3, 1905 |
| 926,730 | Dale | July 6, 1909 |
| 1,771,410 | Landis | July 29, 1930 |
| 1,976,851 | Landis | Oct. 16, 1934 |
| 2,141,070 | Newell | Dec. 20, 1938 |
| 2,211,167 | Safford | Aug. 13, 1940 |

FOREIGN PATENTS

| Number | Country | Date |
|---|---|---|
| 50,257 | Switzerland | of 1910 |
| 628,844 | Germany | of 1936 |
| 211,459 | Switzerland | of 1940 |